US009843735B2

(12) United States Patent
Okazawa

(10) Patent No.: US 9,843,735 B2
(45) Date of Patent: Dec. 12, 2017

(54) IMAGE PROCESSING APPARATUS, IMAGING APPARATUS COMPRISING THE SAME, AND IMAGE PROCESSING METHOD

(71) Applicant: Olympus Corporation, Tokyo (JP)

(72) Inventor: Atsuro Okazawa, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/186,082

(22) Filed: Jun. 17, 2016

(65) Prior Publication Data

US 2016/0301847 A1    Oct. 13, 2016

Related U.S. Application Data

(63) Continuation of application No. PCT/JP2015/059162, filed on Mar. 25, 2015.

(30) Foreign Application Priority Data

Jun. 11, 2014    (JP) .................................. 2014-120912

(51) Int. Cl.
    *H04N 5/235*    (2006.01)
    *H04N 5/369*    (2011.01)
    (Continued)

(52) U.S. Cl.
    CPC .......... *H04N 5/2353* (2013.01); *G02B 7/34* (2013.01); *H04N 5/232* (2013.01); *H04N 5/238* (2013.01);
    (Continued)

(58) Field of Classification Search
    CPC .............. H04N 5/2353; H04N 5/3696; H04N 5/23112; H04N 5/243; H04N 5/238; G03B 7/34; G03B 2217/005; G02B 7/34
    (Continued)

(56) References Cited

U.S. PATENT DOCUMENTS 8,098,310 B2 * 1/2012 Kobayashi ........... H04N 5/2353
    348/294
8,760,529 B2 * 6/2014 Okada .................. H04N 5/3742
    348/221.1

(Continued)

FOREIGN PATENT DOCUMENTS

JP    2000-156823    6/2000
JP    2008-227838    9/2008

(Continued)

OTHER PUBLICATIONS

Translation of International Preliminary Report on Patentability to corresponding International Patent Application No. PCT/JP2015/059162, dated Jun. 23, 2016 (11 pgs.).

(Continued)

*Primary Examiner* — Lin Ye
*Assistant Examiner* — Marly Camargo
(74) *Attorney, Agent, or Firm* — John C. Pokotylo; Pokotylo Patent Services

(57) ABSTRACT

An image processing apparatus performs image processing on image data obtained by using an imaging element comprising a plurality of pixels which comprise a first pixel and a second pixel, wherein two different types of exposure times are applied between the first pixel and the second pixel. A blur amount estimation unit estimates an image blur amount. An exposure time difference calculation unit calculates an exposure time difference. A mixing ratio calculation unit determines a first ratio using a light amount detected by the first pixel to be a target and a second ratio using a light amount detected by the second pixel positioned around the first pixel based on the exposure time difference and the image blur amount. A correction unit corrects the image data based on the image blur amount, the exposure time difference, the first ratio, and the second ratio.

11 Claims, 10 Drawing Sheets

(51) Int. Cl.
    *H04N 5/232*    (2006.01)
    *H04N 5/243*    (2006.01)
    *G02B 7/34*     (2006.01)
    *H04N 5/238*    (2006.01)
    *H04N 9/04*     (2006.01)

(52) U.S. Cl.
    CPC ......... *H04N 5/23212* (2013.01); *H04N 5/243* (2013.01); *H04N 5/3696* (2013.01); *H04N 9/045* (2013.01); *G03B 2217/005* (2013.01)

(58) Field of Classification Search
    USPC ... 348/208.99, 208.4, 208.9, 208.13, 208.16, 348/154, 155, 241, 243, 221.1, 222.1, 348/362, 407.1, 413.1, 345–357; 382/254, 255, 264
    See application file for complete search history.

(56) References Cited

U.S. PATENT DOCUMENTS

| | | | |
|---|---|---|---|
| 2009/0103630 A1* | 4/2009 | Fuchikami | H04N 5/772 375/240.25 |
| 2009/0219425 A1 | 9/2009 | Kobayashi et al. | |
| 2010/0214452 A1 | 8/2010 | Kawarada | |
| 2012/0200744 A1* | 8/2012 | Matsuoka | H04N 5/23254 348/239 |

FOREIGN PATENT DOCUMENTS

| | | |
|---|---|---|
| JP | 2009-044636 | 2/2009 |
| JP | 2009-206925 | 9/2009 |
| JP | 2011-124704 | 6/2011 |
| JP | 2014-030073 | 2/2014 |

OTHER PUBLICATIONS

International Search Report to corresponding International Patent Application No. PCT/JP2015/059162, dated Jun. 23, 2015 (3 pgs.) with translation (2 pgs.).

Written Opinion of the International Searching Authority to corresponding International Patent Application No. PCT/JP2015/059162, dated Jun. 23, 2015 (6 pgs.).

* cited by examiner

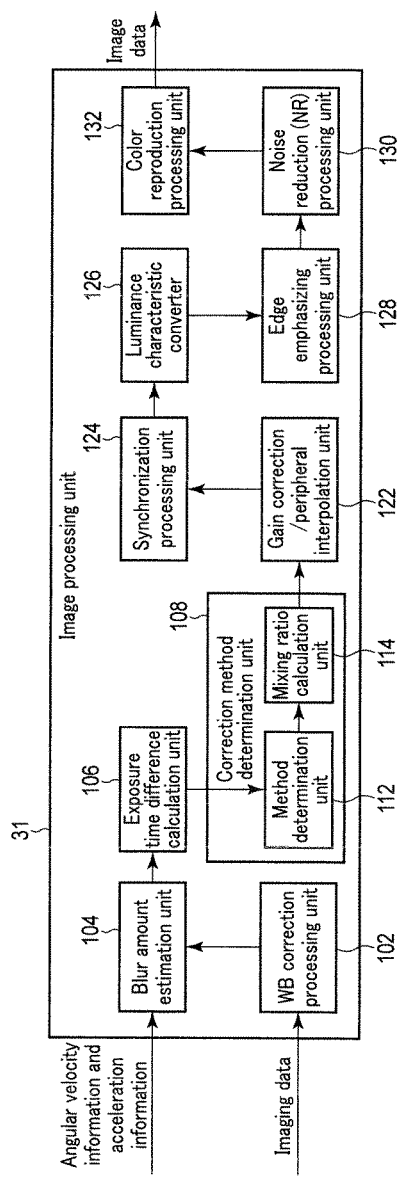
F I G. 5

IMAGE PROCESSING APPARATUS, IMAGING APPARATUS COMPRISING THE SAME, AND IMAGE PROCESSING METHOD

CROSS-REFERENCE TO RELATED APPLICATIONS

This application is a Continuation Application of PCT Application No. PCT/JP2015/059162, filed Mar. 25, 2015 and based upon and claiming the benefit of priority from prior Japanese Patent Application No. 2014-120912, filed Jun. 11, 2014, the entire contents of all of which are incorporated herein by reference.

BACKGROUND OF THE INVENTION

1. Field of Invention

The present invention relates to an image processing apparatus, an imaging apparatus comprising the same, and an image processing method.

2. Description of Related Art

As an imaging element which converts an optical image formed by an optical system into an electric signal, an imaging element in which some pixels are configured to output a signal for focus detection is known. For example, in Jpn. Pat. Appln. KOKAI Publication No. 2000-156823, in order to provide some of the pixels with a ranging function based on a pupil phase difference detection system, a technique is disclosed relating to an imaging element in which a part of a light receiving surface of the pixels is light-shielded. Information acquired by phase difference pixels having such ranging function is, for example, used in auto-focus processing which drives the optical system to an in-focus position. Jpn. Pat. Appln. KOKAI Publication No. 2011-124704 discloses a technique for performing gain correction computation on the information of phase difference pixels, and using the information obtained by the phase difference pixels for forming images for displaying or recording.

In phase difference pixels, it is preferable to perform appropriate exposure control for ranging. Therefore, under circumstances where it is difficult to obtain phase difference information, such as in dark places, a method in which an exposure time is made longer than that of normal pixels for acquiring image signals only for the phase difference pixels is suggested. However, if the exposure times of the phase difference pixels and the normal pixels are different, when photographing a moving object, a difference will occur in the image blurring amounts between the image acquired by the phase difference pixels and the image acquired by the normal pixels due to the difference in the exposure times. As in the technique disclosed in Jpn. Pat. Appln. KOKAI Publication No. 2011-124704, if information acquired by the phase difference pixels is used for an image for displaying or recording, image degradation may occur due to the difference in image blurring amounts being reflected in the generated image.

BRIEF SUMMARY OF THE INVENTION

According to an aspect of the invention, an image processing apparatus performs image processing on image data obtained by using an imaging element comprising a plurality of pixels which comprise a first pixel being a functional pixel with a focus detection function and a second pixel being a non-functional pixel, which is without the focus detection function and is a pixel other than the functional pixel, wherein two different types of exposure times are applied between the functional pixel and the non-functional pixel. The image processing apparatus includes a blur amount estimation unit which estimates an image blur amount present in the image data; an exposure time difference calculation unit which calculates an exposure time difference, the exposure time difference being a difference between an exposure time of the first pixel and an exposure time of the second pixel included in the image data; a mixing ratio calculation unit which, based on the exposure time difference and the image blur amount, determines a first ratio using a light amount detected by the first pixel to be a target and a second ratio using a light amount detected by the second pixel positioned around the first pixel; and a correction unit which corrects the image data based on the image blur amount, the exposure time difference, the first ratio, and the second ratio.

According to an aspect of the invention, an imaging apparatus includes the image processing apparatus; and the imaging element.

According to an aspect of the invention, an image processing method for image data obtained by using an imaging element comprising a plurality of pixels which comprise a first pixel being a functional pixel with a focus detection function and a second pixel being a non-functional pixel, which is without the focus detection function and is a pixel other than the functional pixel, wherein different exposure times are applied between the functional pixel and the non-functional pixel includes estimating an image blur amount present in the image data; calculating an exposure time difference which is a difference between an exposure time of the first pixel and an exposure time of the second pixel included in the image data; determining a first ratio using a light amount detected by the first pixel to be a target and a second ratio using a light amount detected by the second pixel positioned around the first pixel to be the target based on the exposure time difference and the image blur amount; and correcting the image data based on the image blur amount, the exposure time difference, the first ratio, and the second ratio.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram showing an outline of an exemplary configuration of an image processing unit according to the embodiment;

DETAILED DESCRIPTION OF THE INVENTION

Figure 1:
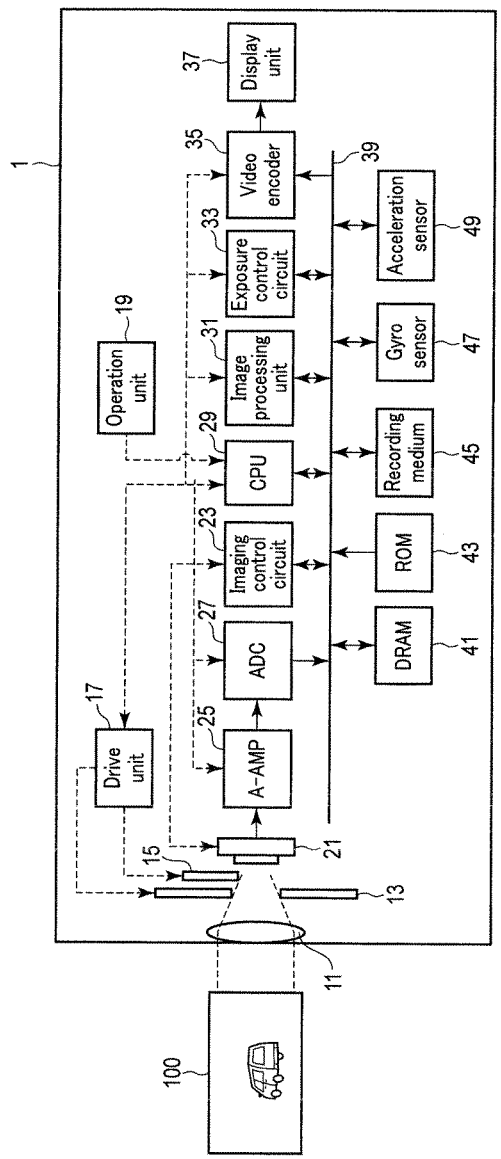
FIG. 1 is a block diagram showing an outline of an exemplary configuration of an imaging apparatus according to an embodiment of the present invention.

An embodiment of the present invention will be described with reference to the drawings. FIG. 1 is a block diagram showing a configuration of a digital camera 1 as an example of an imaging apparatus according to the embodiment of the present invention. Here, in FIG. 1, solid arrows show the flow of data, and dashed arrows show the flow of control signals.

The digital camera 1 shown in FIG. 1 comprises a photographing lens 11, a diaphragm 13, a mechanical shutter 15, a drive unit 17, an operation unit 19, an imaging element 21, an imaging control circuit 23, an A-AMP 25, an analog-to-digital converter (ADC) 27, a central processing unit (CPU) 29, an image processing unit 31, an exposure control circuit 33 which functions as an exposure controller, a video encoder 35, a display unit 37, a bus 39, a dynamic random access memory (DRAM) 41, a read only memory (ROM) 43, a recording medium 45, a gyro sensor 47, and an acceleration sensor 49.

The photographing lens 11 is an optical system which comprises a single or a plurality of lenses for forming a picture of an object 100 on the imaging element 21. The photographing lens 11 may be a single focus lens or a zoom lens. The diaphragm 13 is arranged on an optical axis of the photographing lens 11 and is configured to be capable of changing an aperture thereof. The diaphragm 13 limits the amount of luminous flux passing through the photographing lens 11 from the object 100. The mechanical shutter 15 is arranged behind the diaphragm 13 and is configured to open/close. By adjusting the open time, the mechanical shutter 15 adjusts the incidence time of the object luminous flux entering the imaging element 21 from the object 100. In other words, the mechanical shutter 15 adjusts the exposure time of the imaging element 21. A publicly known focal plane shutter or a lens shutter, etc. may be employed as the mechanical shutter 15. Based on control signals from the CPU 29, the drive unit 17 performs focusing of the photographing lens 11, open aperture control of the diaphragm 13, and open/close control of the mechanical shutter 15.

The operation unit 19 comprises various types of operation buttons, such as a power button, a release button, a playback button, and a menu button, and various types of operation members, such as a touch panel. An input to this operation unit 19 is recognized by the processing carried out by the CPU 29.

The imaging element 21 is arranged on the optical axis of the photographing lens 11, behind the mechanical shutter 15, and at a position where the object luminous flux forms an image by the photographing lens 11. The imaging element 21 is configured in a manner where photodiodes comprising the pixels are arranged two-dimensionally. The photodiodes comprising the imaging element 21 generate an electric charge in accordance with the received light amount. The electric charge generated in the photodiodes is stored in a capacitor connected to each photodiode. The electric charge stored in this capacitor is read out as an image signal. Here, the imaging element 21 in the present embodiment comprises a plurality of read out methods of different charges. The electric charge stored in the imaging element 21 is read out in accordance with a control signal from the imaging control circuit 23.

For example, color filters of a Bayer array are arranged in front of the photodiodes configuring the pixels. The Bayer array comprises a line in which R pixels and G (Gr) pixels are arranged alternately and a line in which G (Gb) pixels and B pixels are arranged alternately in a horizontal direction.

In the imaging element 21 of the present embodiment, phase difference detection pixels are arranged in some parts. In other words, in the imaging element 21, other than the imaging pixels for acquiring an image for recording and displaying, phase difference detection pixels are provided. In a phase difference detection pixel, unlike the other pixels, a part of the region is light-shielded. This phase difference detection pixel functions as a focus detection pixel used in focus detection.

Figure 2:
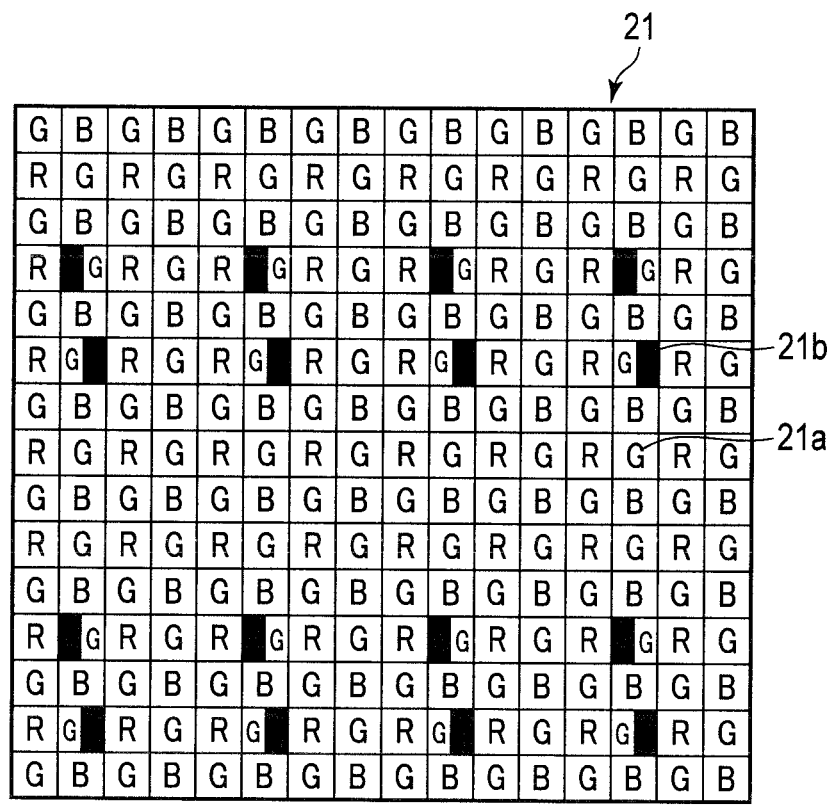
FIG. 2 illustrates an outline of an exemplary configuration of an imaging element according to the embodiment.

The configuration of the imaging element 21 will be explained using FIG. 2. FIG. 2 is a schematic diagram showing a pixel array of the imaging element 21. In FIG. 2, "R" indicates an R pixel to which a red color filter is provided, "G" indicates a G pixel to which a green color filter is provided, and "B" indicates a B pixel to which a blue color filter is provided. The region in black indicates a light-shielded region. FIG. 2 shows an example of a Bayer array. However, the array of color filters is not limited to the Bayer array, so various arrays may be used.

As mentioned above, the imaging element 21 in the form of a Bayer array comprises a line in which the R pixels and the G(Gr) pixels are arranged alternately, and a line in which the G(Gb) pixels and the B pixels are arranged alternately in a horizontal direction. In other words, in the imaging element 21 in the form of a Bayer array, a set of four pixels of the Gr pixel, the R pixel, the Gb pixel, and the B pixel is arranged repeatedly in the horizontal and the vertical directions.

In the present embodiment, a phase difference detection pixel 21b provided with a light shielding film is arranged mixed with the normal pixel 21a provided with a red filter, a green filter, or a blue filter. The phase difference detection pixel is, for example, a pixel in which either the right or the left region is shielded by a light shielding film. In the example of FIG. 2, a line with a phase difference detection pixel whose left half surface is light shielded (hereinafter, referred to as a right opening phase difference detection pixel) and a line with a phase difference detection pixel whose right half surface is light shielded (hereinafter, referred to as a left opening phase difference detection pixel) are arranged alternately.

In the case of an imaging element with a large number of pixels, since the area of each pixel may be considered as becoming smaller, pixels arranged in proximity may be considered as forming approximately the same image. Accordingly, by arranging the phase difference detection pixels in the manner shown in FIG. 2, a phase difference may be detected in pairs of the proximal right opening phase difference detection pixel and left opening phase difference detection pixel.

Here, in the example of FIG. 2, the light-shielded region in the phase difference detection pixel is either the left or the right region. In this case, a horizontal phase difference is detected. In contrast, if the light-shielded region is either the upper or the lower region, or a diagonal region, a vertical phase difference or a diagonal phase difference will be detected. The light-shielded area does not have to be half the pixel region as long as it has a certain amount of area. Furthermore, in the example shown in FIG. 2, the phase difference detection pixel is arranged in the G pixel. However, it may be arranged in either the R pixel or the B pixel, which is other than the G pixel.

The example of FIG. 2 shows an example of pupil-splitting by light-shielding a part of the region of the phase difference detection pixel. However, the phase difference detection pixel only needs to selectively receive light of one of the object luminous fluxes forming a pair passing through different pupil regions of the photographing lens 11. Therefore, instead of a configuration which shields light of a part of a region, the pupil-splitting may be done by, for example, a microlens for pupil-splitting.

Figure 3A:
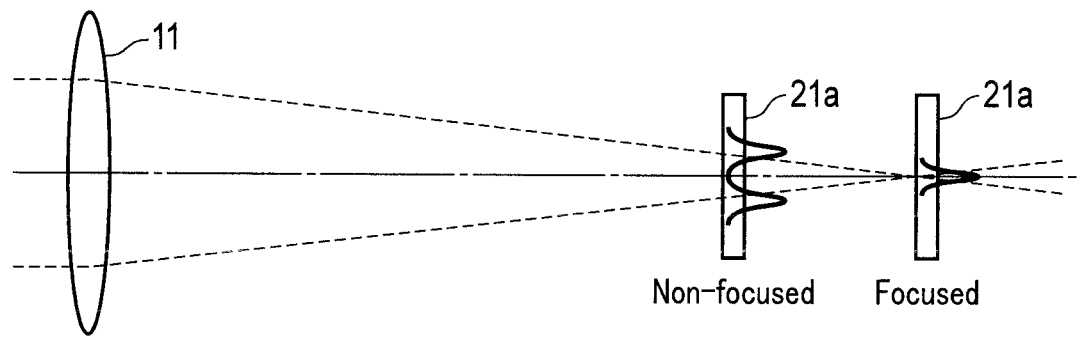
FIG. 3A is a diagram for explaining a principle of focus detection according to a phase difference method using the imaging element according to the embodiment.
Figure 3B:
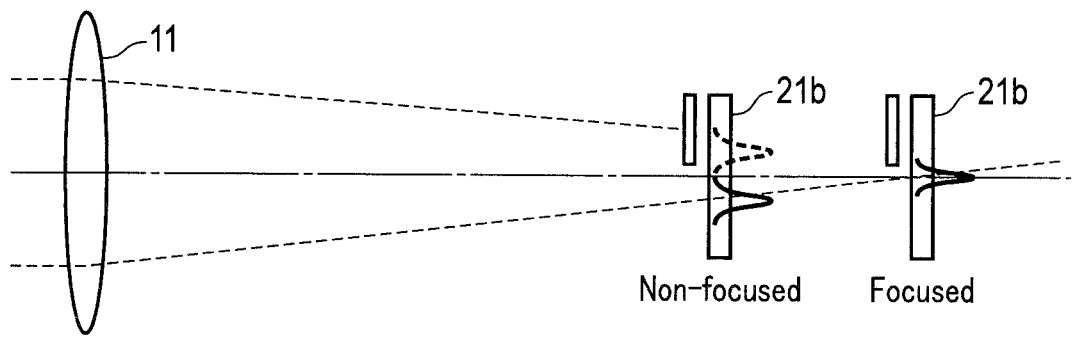
FIG. 3B is a diagram for explaining a principle of focus detection according to the phase difference method using the imaging element according to the embodiment.

The principle of focus detection by a phase difference method using an imaging element as shown in FIG. 2 will be explained with reference to FIG. 3A and FIG. 3B. Here, FIG. 3A shows an image forming state in the normal pixel 21*a*. FIG. 3B shows an image forming state in the phase difference detection pixel 21*b*.

If the object is a point light source, in the case where the photographing lens 11 is in a focusing state, the object luminous fluxes formed in pairs emitted from the object and passing through different pupil regions symmetrical to an optical axis center of the photographing lens 11 form an image at a same position on the imaging element 21.

However, if the photographing lens 11 is in a non-focusing state, the object luminous fluxes formed in pairs emitted from the object and passing through different pupil regions of the photographing lens 11 form an image at different positions on the imaging element 21. In other words, a phase difference will occur between the images formed by these object luminous fluxes formed in pairs. By detecting this phase difference from the correlative relationship of each of the images detected in the right opening phase difference detection pixel and the left opening phase difference detection pixel, a defocus amount and a defocus direction of the photographing lens 11 may be detected.

In the phase difference detection pixel 21*b*, since a part of the region is light-shielded, a decrease in the amount of light occurs. The decrease in the amount of light differs depending on the position of the light shielding film, the angle of light entering the phase difference detection pixel 21*b*, and image height, in addition to the area of the light-shielding film formed in the phase difference detection pixel 21*b*.

The imaging control circuit 23 sets a readout method of the imaging element 21 in accordance with the control signal from the CPU 29, and controls readout of an image signal from the imaging element 21 in accordance with the set readout method. The readout method of pixel data from the imaging element 21 is set in accordance with the operating state of a digital camera 1. For example, in the case where real-time property is required in reading out the pixel data from the imaging element 21 (for example, when displaying live view or recording a moving image), in order to read out the pixel data at high-speed, pixel data from a plurality of same color pixels is mixed and read out, or pixel data of a specific pixel is thinned and read out. However, in the case where image quality is desired more than the real-time property (for example, when recording a still image), resolving power is maintained by reading out the pixel data of all of the pixels instead of performing a mixture readout or thinning readout.

The A-AMP 25 performs analog gain adjustment of the image signal output from the imaging element 21. The ADC 27 is an analog-to-digital converter which converts the image signal to which analog gain adjustment was applied by the A-AMP 25 into a digital format image signal (pixel data). Hereinafter, in the present specification, a group of a plurality of pixel data will be mentioned as imaging data.

The CPU 29 performs overall control of the digital camera 1 in accordance with a program stored in the ROM 43 mentioned later on. The CPU 29 also calculates the moving amount of the digital camera 1 based on the output of the gyro sensor 47 and the acceleration sensor 49, and stores the calculated result in the DRAM 41.

The image processing unit 31 is configured, for example, by application specific integrated circuit (ASIC). The image processing unit 31 generates image data by applying various kinds of image processing to the imaging data. For example, when recording a still image, the image processing unit 31 applies an image processing for still-image recording to the imaging data and generates the still image. In a similar manner, when recording a moving image, the image processing unit 31 applies an image processing for moving-image recording to the imaging data and generates the moving image. Furthermore, when displaying a live view, the image processing unit 31 applies an image processing for display to the imaging data and generates an image data for display. The image processing unit 31 reads out the image data and the moving amount of the digital camera 1 from the DRAM 41, performs image processing, and writes the data obtained after the image processing back to the DRAM 41 as image data for recording.

The exposure control circuit 33 is configured by, for example, ASIC. The exposure control circuit 33 calculates an exposure value based on, for example, the imaging data, and adjusts a shutter speed, an aperture value, and sensitivity based on the calculated exposure value.

The normal pixels and the phase difference pixels according to the present embodiment are controlled at different shutter speeds by the electronic shutter. In other words, since an opening area in the phase difference pixels is smaller than that in the normal pixels, when preparing an image using data obtained at the same exposure time between the phase difference pixels and the normal pixels, there will be an insufficient amount of light in the part of the phase difference pixels. Therefore, when obtaining an equal exposure amount between the phase difference pixels and the normal pixels, the exposure time of the phase difference pixels is adjusted to become longer than the exposure time of the normal pixels. The mechanism for controlling the phase difference pixels and the normal pixels at different shutter speeds will be called an independent electronic shutter. The exposure control circuit 33 also sets the shutter speed concerning the independent electronic shutter.

In the present embodiment, an example of providing phase difference pixels, a part of which pixels are covered for phase difference detection, is described. The independent electronic shutter is not limited to the usage in an imaging element comprising the above-mentioned phase difference pixels, and may be used for a variety of purposes. For example, in order to expand a dynamic range, the exposure time may be adjusted differently between some pixels and other pixels. Based on imaging data with different exposure time for every pixel, high dynamic ranged image data may be obtained. In the above manner, according to the independent electronic shutter, a variety of functions may be realized. In the following explanations, pixels with an exposure time different from the other pixels for realizing a predetermined function will be termed functional pixels, and the other pixels, such as normal pixels, will be termed non-functional pixels. The technique according to the present embodiment is not limited to the technique concerning phase difference detection; therefore, may be used for a variety of techniques in which functional pixels and non-functional pixels are present.

Figure 4A:
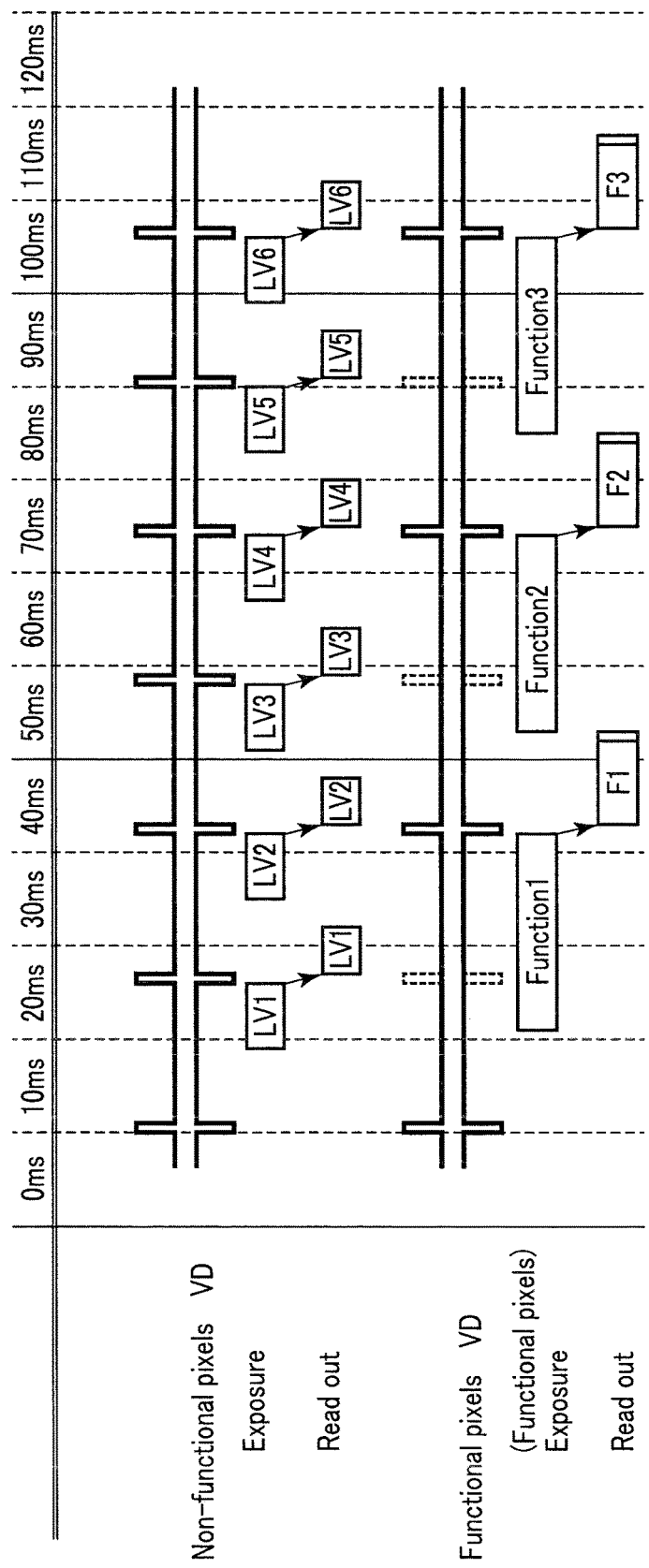
FIG. 4A is a timing chart for explaining an independent electronic shutter operation performed during a live view display according to the embodiment.
Figure 4B:
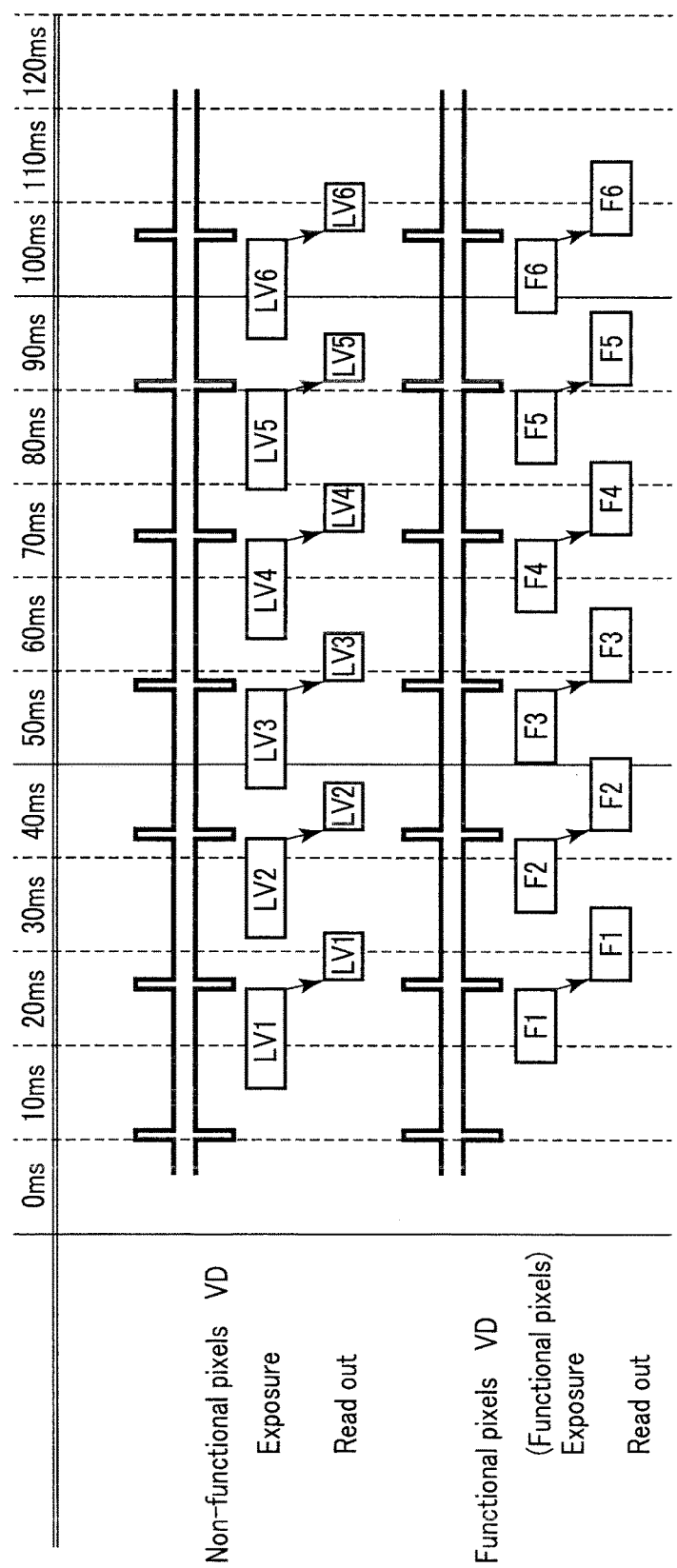
FIG. 4B is a timing chart for explaining an independent electronic shutter operation performed during a live view display according to the embodiment.

The independent electronic shutter when performing a live view display in the present embodiment will be explained with reference to the timing charts shown in FIG. 4A and FIG. 4B. FIG. 4A shows a timing chart of an operation at a time of low luminance, and FIG. 4B shows a timing chart of an operation at a time of high luminance. In the present embodiment, each of the functional pixels and the non-functional pixels is controlled independently. In FIG. 4A and FIG. 4B, each of the upper row indicates the operation of the non-functional pixels of the normal pixels, etc., and the lower row indicates the operation of the functional pixels of, for example, the phase difference pixels.

The operation at the time of low luminance shown in FIG. 4A will be explained. The first row in each of the timing chart of the non-functional pixels, and the timing chart of the functional pixels indicated as "VD" represents a control counter. In the present embodiment, the case of 30 frames per second is shown, and a pulse occurs every 33 ms for the control counter. The second row of each of the timing chart of the non-functional pixels and the timing chart of the functional pixels indicates the timing of exposure performed at the imaging element 21. The third row of each of the timing chart of the non-functional pixels and the timing chart of the functional pixels indicates the timing of reading out the exposure data.

The end of the exposure of the non-functional pixels is adjusted to coincide with the timing at which the control counter changes. The end of the exposure of the functional pixels is adjusted to be simultaneous with the end of the exposure of the non-functional pixels. Therefore, the timing of the start of exposure of the non-functional pixels and the start of exposure of the functional pixels will be different. At the time of low luminance, in order to allow focus detection in a dark place, the exposure time of the functional pixels is adjusted longer than the exposure time of the non-functional pixels. The non-functional pixels and the functional pixels are read out, respectively, after the control counter has changed.

Similar to the case of the time of low luminance, at the time of high luminance shown in FIG. 4B, the end of both of the exposures of the non-functional pixels and the functional pixels is adjusted to coincide with the timing at which the control counter changes. The non-functional pixels and the functional-pixels are read out, respectively, after the control counter has changed. At the time of high luminance, for example, to allow focus detection even with backlight, the exposure time of the functional pixels is adjusted to be shorter than the exposure time of the non-functional pixels.

Figure 4C:
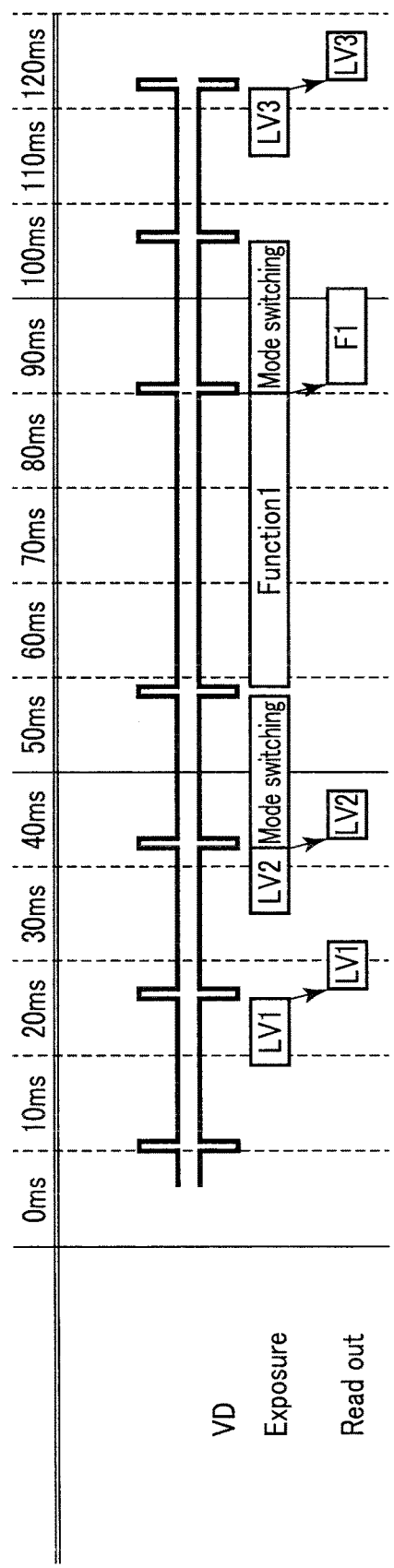
FIG. 4C is a timing chart for explaining an electronic shutter operation performed during a live view display according to a comparative example.

As a comparative example, a timing chart in the case of switching between the exposure of the non-functional pixels and the exposure of the functional pixels sequentially is shown in FIG. 4C. As shown in FIG. 4C, in the case of the comparative example, after the exposure for non-functional pixels, mode switching is performed simultaneously with the readout, and subsequently, after the exposure for functional pixels is performed, mode switching is performed simultaneously with the readout. In the operation as in this comparative example, image acquisition is discontinuous, which would not allow a smooth moving image to be obtained. In contrast, according to the independent electronic shutter of the present embodiment, luminance robustness of the function of the functional pixels may become considerably higher while obtaining a smooth image.

The exposure control circuit 33 acquires pixel data from the DRAM 41 and calculates the electronic shutter speeds of the functional pixels and the non-functional pixels. The exposure control circuit 33 stores the calculated electronic shutter speeds of the functional pixels and the non-functional pixels in the DRAM 41. Based on this electronic shutter speed, the CPU 29 causes the imaging control circuit 23 to perform imaging at different shutter speeds.

The video encoder 35 reads out the image data for display generated and stored temporarily in the DRAM 41 by the image processing unit 31, and outputs the read out image data for display to the display unit 37.

The display unit 37 is, for example, a liquid crystal display or an organic EL display, and is, for example, arranged on the back surface of the digital camera. This display unit 37 displays an image in accordance with the image data for display input from the video encoder 35. The display unit 37 is used to display the live view display or recorded image display, etc.

The bus 39 is connected to the ADC 27, the CPU 29, the image processing unit 31, the exposure control circuit 33, the video encoder 35, the DRAM 41, the ROM 43, the recording medium 45, the gyro sensor 47, and the acceleration sensor 49. Various types of data generated by each of these units are forwarded via the bus 39.

The DRAM 41 is an electrically rewritable memory which temporarily stores various types of data such as the aforementioned imaging data (pixel data), image data for recording, image data for display, moving amount data of the digital camera 1, and processing data in the CPU 29. As for temporary storage, synchronous dynamic random access memory (SDRAM) may be used.

The ROM 43 which functions as an example of a storage unit is a non-volatile memory such as a mask ROM or a flash memory, etc. The ROM 43 stores programs to be used at the CPU 29 and various types of data such as an adjustment value, etc. of the digital camera 1.

The recording medium 45 is embedded in or configured to be loaded freely on the digital camera 1, and records the image data for recording as an image file in a predetermined format.

The gyro sensor 47 is a sensor for detecting angular velocity accompanying the posture change of the digital camera 1. The gyro sensor 47 stores data indicating the detected angular velocity in the DRAM 41. The acceleration sensor 49 is a sensor for detecting acceleration accompanying the posture change of the digital camera 1. The acceleration sensor 49 stores data indicating the detected acceleration in the DRAM 41. As mentioned above, these data are processed at the CPU 29.

In the present embodiment, when the digital camera 1 and the object are static, imaging performed by using an independent electronic shutter would not affect the image. However, for example, when the object is moving, if the exposure time differs between the functional pixels and the non-functional pixels, a difference in image blur will occur only for the functional pixel parts, which will cause an unnatural image. In the present embodiment, in order to prevent the differences in this local image blur, in a state where local image blur occurs, the information of the functional pixels is interpolated by the information of peripheral non-functional pixels. However, under circumstances where local image blur does not occur, the information of the functional pixels is used as the image information. The image processing unit 31 performs an operation to prevent such difference in image blur.

FIG. 5 shows a detailed configuration of the image processing unit 31. In FIG. 5, blocks other than the block of the image processing unit 31 are not shown. The image processing unit 31 comprises a white balance (WB) correction processing unit 102, a blur amount estimation unit 104, an exposure time difference calculation unit 106, a correction method determination unit 108, a gain correction/peripheral interpolation unit 122, a synchronization processing unit 124, a luminance characteristic converter 126, an edge emphasizing processing unit 128, a noise reduction (NR) processing unit 130, and a color reproduction processing unit 132. Although not shown, the image processing unit 31 also comprises a compression/decompression processing unit, etc.

WB correction processing unit 102 corrects the color balance of an image by amplifying each color component of the imaging data by a predetermined gain amount.

The blur amount estimation unit 104 acquires an image moving amount of the digital camera 1 calculated from the angular velocity and the acceleration calculated based on the information acquired by the gyro sensor 47 and the acceleration sensor 49. The blur amount estimation unit 104 acquires a motion vector for each region within the image calculated from a publicly-known computation, such as block matching. The blur amount estimation unit 104 calculates an image blur amount, which is an amount in which the image moves in each region, based on the moving amount of the digital camera 1 and the motion vector for each region within the image.

In performing the control for driving the functional pixels and the non-functional pixels under a suitable exposure condition in accordance with each usage thereof, the exposure time difference calculation unit 106 calculates the exposure time difference which is the difference in the shutter speed between the functional pixels and the non-functional pixels.

The correction method determination unit 108 comprises a method determination unit 112 and a mixing ratio calculation unit 114. The method determination unit 112 determines whether or not to correct the functional pixels using a peripheral pixel value, based on the blur amount for each region calculated by the blur amount estimation unit 104 and the exposure time difference between the functional pixels and the non-functional pixels calculated by the exposure time difference calculation unit 106. In the case where the method determination unit 112 determines that the functional pixels should be corrected using the peripheral pixel value, the mixing ratio calculation unit 114 determines the weighting to be used when performing mixing in which pixel values of the functional pixels themselves and pixel values of the peripheral pixels are weighted, based on the blur amount calculated by the blur amount estimation unit 104 and the exposure time difference calculated by the exposure time difference calculation unit 106.

The gain correction/peripheral interpolation unit 122 functions as a correction unit which applies correction to the image. Based on the weighting calculated by the mixing ratio calculation unit 114, the gain correction/peripheral interpolation unit 122 performs mixing in which the pixel values of the functional pixels themselves and the pixel values of the peripheral pixels are weighted.

The synchronization processing unit 124 converts imaging data which, for example, corresponds to a Bayer array and is output via the imaging element 21, in which one pixel corresponds to one color component, into image data in which one pixel corresponds to a plurality of color components.

The luminance characteristic converter 126 converts the luminance characteristics of the image data generated by the synchronization processing unit 124 to be suitable for display and recording. The edge emphasizing processing unit 128 multiplies an edge signal extracted from the image data using a band pass filter, etc. by an edge emphasizing coefficient, and adds the result to the original image data to emphasize an edge (profile) component in the image data. The NR processing unit 130 removes a noise component in the image data using a coring processing, etc.

The color reproduction processing unit 132 performs various types of processing to achieve suitable color reproduction of the image. As this processing, for example, there is a color matrix computation processing. The color matrix computation processing multiplies the image data by, for example, a color matrix coefficient in accordance with a white balance mode. The color reproduction processing unit 132 also corrects saturation/hue.

Figure 6:
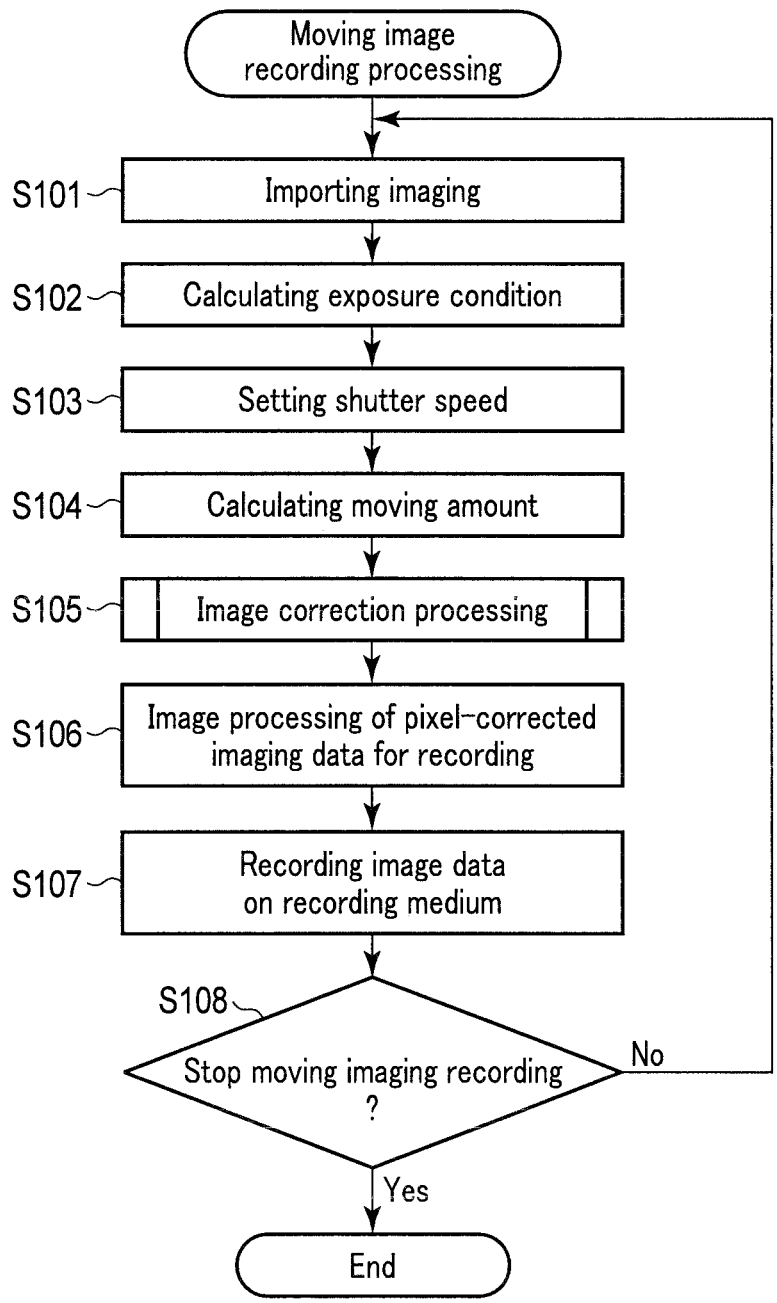
FIG. 6 is a flowchart showing an example of a moving image recording processing according to the embodiment.

The operation of the digital camera 1 according to the present embodiment will be explained. An example of processing a moving image by the digital camera according to the present embodiment will be explained with reference to the flow chart shown in FIG. 6. A moving image recording is started by, for example, pressing a release button during a moving image imaging mode. Here, the processing of the moving image recording is explained. However, the same processing may also be carried out for the operation of a still image recording. The processing explained with reference to FIG. 6 is carried out by the CPU 29 or the ASIC according to a program stored in the ROM 43. The programs related to the processing may also be recorded on various types of recording medium, such as an optical disc, a magnetic disc, or a semiconductor memory.

In S101, the CPU 29 starts importing the imaging data. Here, the CPU 29 inputs setting data in the imaging control circuit 23 in accordance with the current operation mode. The exposure control circuit 33 inputs into the imaging control circuit 23 the exposure time concerning the independent electronic shutter that is determined based on the imaging data acquired in the previous frame. The imaging control circuit 23 controls the readout of the pixel data from the imaging element 21 according to these setting data. When a readout method is set in the imaging control circuit 23, an image signal is read out from the imaging element 21 in a state where pixel mixing or pixel thinning has been carried out. The image signal read out from the imaging element 21 is stored temporarily in the DRAM 41 as imaging data after it is digitalized at the ADC 27.

In S102, the exposure control circuit 33 determines from the imaging data an exposure condition concerning the next frame. Here, the exposure control circuit 33 calculates a suitable shutter speed for each of the functional pixels and the non-functional pixels. Here, the shutter speeds may be different between the functional pixels and the non-functional pixels.

In S103, the exposure control circuit 33 independently sets the shutter speed of each of the functional pixels and the non-functional pixels. The set shutter speed is stored temporarily in the DRAM 41. This shutter speed is read out by the imaging control circuit 23. The imaging control circuit 23 will drive the imaging element 21 at the determined shutter speed.

In S104, the CPU 29 acquires the output of the gyro sensor 47 and the output of the acceleration sensor 49. The CPU 29 calculates the angular velocity concerning the digital camera 1 based on the output of the gyro sensor 47, and calculates the acceleration concerning the digital camera 1 based on the output of the acceleration sensor 49. In other words, the CPU 29 calculates the moving amount of the digital camera 1. Here, the value calculated based on the output of the gyro sensor 47 will be referred to as a first moving amount mov_sum_o. The value calculated based on the output of the acceleration sensor 49 will be referred to as a second moving amount mov_sum_i.

The image processing unit 31 calculates the moving amount of the object mov_sum_v included in the imaged image for each image region. For the calculation of the moving amount of the object, a given motion vector calculation method, such as a correlation computation by block matching, may be used.

In S105, the image processing unit 31 performs pixel correction processing according to the present embodiment. This pixel correction processing corrects degradation of the image caused by the difference in the shutter speeds between the non-functional pixels and the functional pixels. The pixel correction processing will be explained in detail later on.

In S106, the image processing unit 31 performs image processing for recording on the imaging data corrected by the pixel correction processing. In S107, the image processing unit 31 records the image data to which image processing was applied on a recording medium.

In S108, the CPU 29 determines whether or not an instruction for stopping moving image recording has been input. The instruction for stopping moving image recording is input, for example, by pressing the release button during the moving image recording operation. If the instruction for stopping moving image recording is not input, the processing returns to step S101. If the instruction for stopping moving image recording is input, the current moving image recording processing ends.

Figure 7:
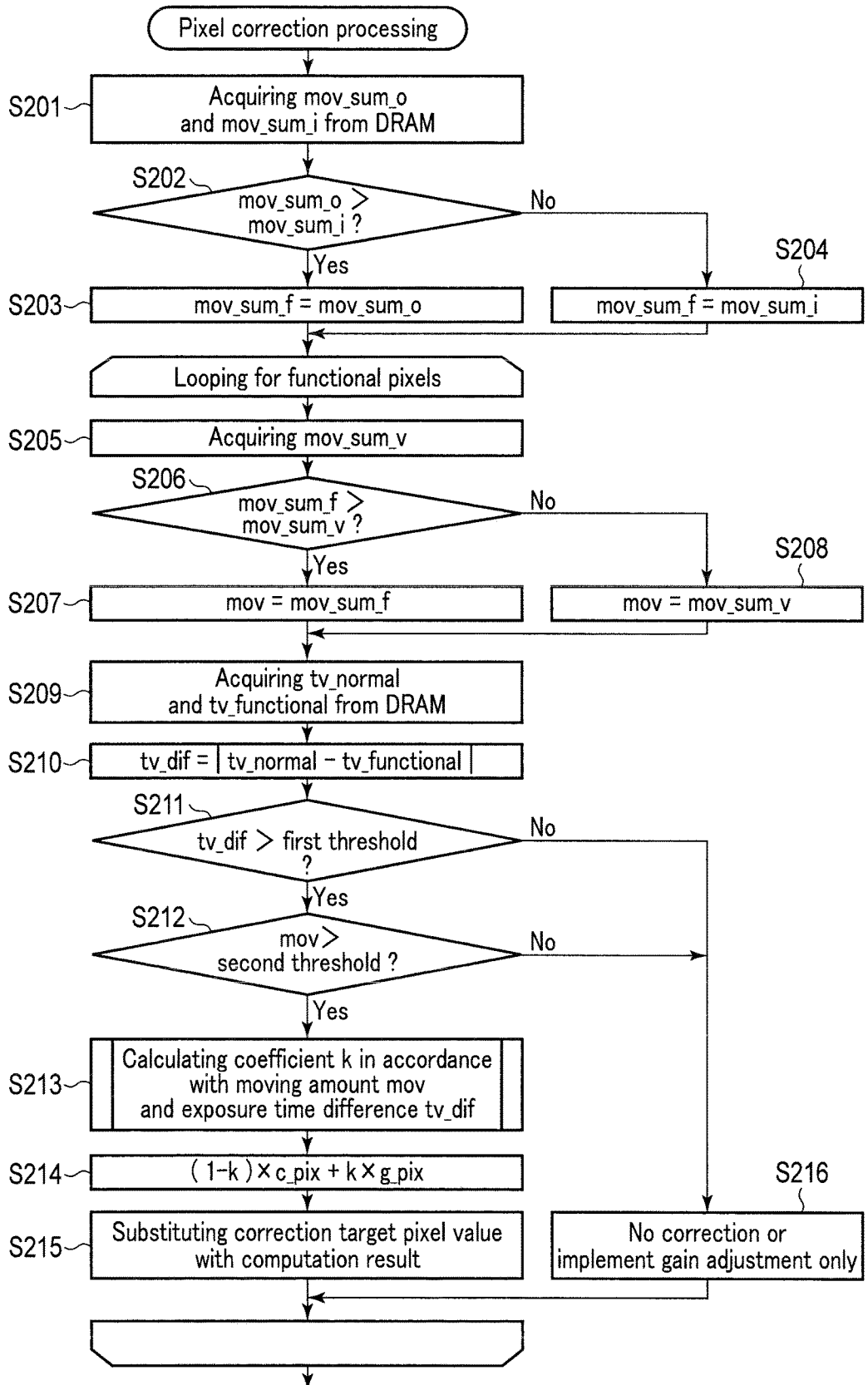
FIG. 7 is a flowchart showing an example of a pixel correction processing according to the embodiment.

The pixel correction processing will now be explained with reference to the flow chart shown in FIG. 7. In step S201, the blur amount estimation unit 104 acquires from the DRAM 41 the first moving amount mov_sum_o of the digital camera 1 calculated based on the output of the gyro sensor 47 in step S104. The blur amount estimation unit 104 acquires from the DRAM 41 the second moving amount mov_sum_i of the digital camera 1 calculated based on the output of the acceleration sensor 49.

In step S202, the blur amount estimation unit 104 determines whether or not the first moving amount mov_sum_o is greater than the second moving amount mov_sum_i. If the first moving amount mov_sum_o is greater than the second moving amount mov_sum_i, the processing proceeds to step S203. In step S203, the blur amount estimation unit 104 determines the first moving amount mov_sum_o as being a conclusively determined third moving amount mov_sum_f of the digital camera 1. Subsequently, the processing proceeds to S205.

If it is determined in step S202 that the first moving amount mov_sum_o is not greater than the second moving amount mov_sum_i, the processing proceeds to step S204. In step S204, the blur amount estimation unit 104 determines the second moving amount mov_sum_i as being the conclusively determined third moving amount mov_sum_f of the digital camera 1. Subsequently, the processing proceeds to S205.

The processing in step S201 to step S204 sets, between the moving amount of the digital camera 1 acquired by the gyro sensor 47 and the moving amount of the digital camera 1 acquired by the acceleration sensor 49, the third moving amount mov_sum_f to a moving amount that is greater.

The processing in step S205 to step S216 is a loop processing that is performed in sequence for all of the functional pixels. In step S205, the blur amount estimation unit 104 acquires from the DRAM 41 the moving amount of the object mov_sum_v which is calculated in the motion vector calculation processing using block matching of step S104.

In step S206, the blur amount estimation unit 104 determines whether or not the third moving amount mov_sum_f is greater than the moving amount of the object mov_sum_v. If the third moving amount mov_sum_f is determined as being greater than the moving amount of the object mov_sum_v, the processing proceeds to step S207. In step S207, the blur amount estimation unit 104 determines the third moving amount mov_sum_f as being the moving amount mov of the conclusively calculated correcting target region. Subsequently, the processing proceeds to step S209.

If it is determined in step S206 that the third moving amount mov_sum_f is not greater than the moving amount of the object mov_sum_v, the processing proceeds to step S208. In step S208, the blur amount estimation unit 104 determines the moving amount of the object mov_sum_v as being the moving amount mov of the conclusively calculated correcting target region. Subsequently, the processing proceeds to step S209.

The processing in step S205 to step S208 sets, between the third moving amount mov_sum_f and the moving amount of the object mov_sum_v, the moving amount mov of the correcting target region to the one that is greater. In this manner, the moving amount mov of the correcting target region is a value representing a blur amount which may be included in a target region in which a blur caused by the movement of the digital camera 1 and a blur caused by the movement of the object are considered for each target region.

In step S209, the exposure time difference calculation unit 106 acquires from the DRAM 41 an exposure time of the non-functional pixels tv_normal and an exposure time of the functional pixels tv_functional. In step S210, the exposure time difference calculation unit 106 calculates an exposure time difference tv_dif which is an absolute value of the difference between the exposure time of the non-functional pixels tv_normal and the exposure time of the functional pixels tv_functional.

In step S211, the method determination unit 112 determines whether or not the exposure time difference tv_dif is greater than a first threshold value. If the exposure time difference tv_dif is determined as not being greater than the first threshold value, the processing proceeds to step S216.

If the exposure time difference tv_dif is determined as being greater than the first threshold value, the processing proceeds to step S212.

In step S212, the method determination unit 112 determines whether or not the moving amount mov of the correcting target region is greater than a second threshold value. If the moving amount mov of the correcting target region is determined as not being greater than the second threshold value, the processing proceeds to step S216. If the moving amount mov of the correcting target region is determined as being greater than the second threshold value, the processing proceeds to step S213.

In step S213, the mixing ratio calculation unit 114 determines a coefficient k representing a utilization ratio of the functional pixels based on the moving amount mov of the correcting target region and the exposure time difference tv_dif. An example of a method of determining the coefficient k will be explained.

Figure 8A:
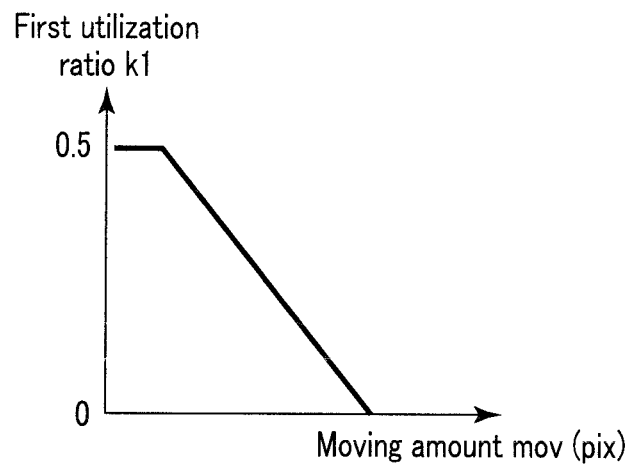
FIG. 8A illustrates an example of a relationship between a moving amount of a moving object and a first utilization ratio according to the embodiment.
Figure 8B:
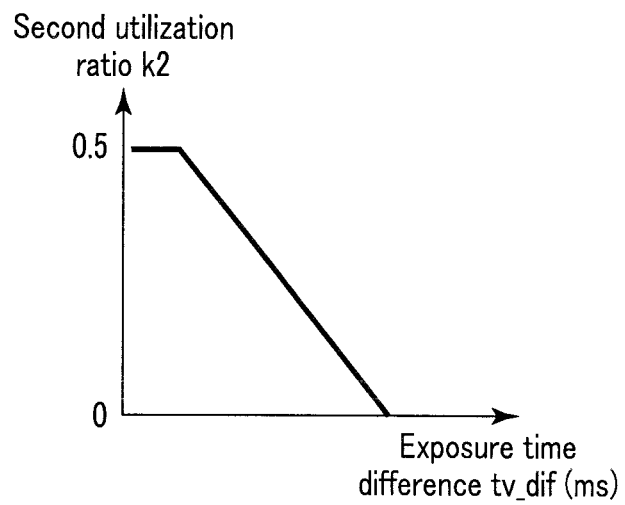
FIG. 8B illustrates an example of a relationship between an exposure time difference and a second utilization ratio according to the embodiment.

FIG. 8A shows the relationship between the moving amount mov of the correcting target region and a first utilization ratio k1, which is the usage ratio of the functional pixels determined based on the moving amount mov. As shown in this diagram, if the moving amount mov of the correcting target region is smaller than a predetermined value, the first utilization ratio k1 is set to 0.5. As the moving amount mov of the correcting target region increases, the first utilization ratio k1 decreases. FIG. 8B shows the relationship between the exposure time difference tv_dif and a second utilization ratio k2, which is the usage ratio of the functional pixels determined based on the exposure time difference tv_dif. As shown in this diagram, if the exposure time difference tv_dif is smaller than a predetermined value, the second utilization ratio k2 is set to 0.5. As the exposure time difference tv_dif increases, the second utilization ratio k2 decreases. The utilization ratio of the functional pixels k is determined by k=k1+k2.

If the moving amount mov of the correcting target region and the exposure time difference tv_dif are sufficiently small, the utilization ratio of the functional pixels k is set to one. If the moving amount mov of the correcting target region is minute, an effect on the image may be considered sufficiently small. Therefore, as shown in FIG. 8A, if the moving amount mov of the correcting target region is minute, the first utilization ratio k1 is set to 0.5. Similarly, if the exposure time difference tv_dif is minute, an effect on the image may be considered sufficiently small. Therefore, as shown in FIG. 8B, if the exposure time difference tv_dif is minute, the second utilization ratio k2 is set to 0.5.

Here, the relationships shown in FIG. 8A and FIG. 8B are, of course, examples. These relationships may be expressed otherwise. For example, these relationships may have a non-linear relationship instead of a linear relationship. Instead of the moving amount of the correcting target region and the exposure time difference having equal weightings, either one may be given greater importance. In other words, for example, the combination may be such that if the moving amount of the correcting target region is zero, the first utilization ratio is 0.7, and, if the exposure time difference is zero, the second utilization ration is 0.3.

The explanation will continue, returning to FIG. 7. In step S214, the mixing ratio calculation unit 114 determines a corrected pixel value I based on the following formula using the utilization ratio k of the functional pixels.

$$I=(1-k) \times c\_pix + k \times g\_pix$$

Here, g_pix is an output value of the functional pixels of the correcting target or an output value of the functional pixels of the correcting target that has been gain adjusted. Furthermore, c_pix is an addition average value of pixel values near the correcting target pixels. In other words, when a coordinate of the target functional pixel is [0][0], and the pixel value of the coordinate thereof is pix [0][0], c_pix is given, for example, by the following formula.

$$c\_pix=(pix[-1][0]+pix[0][-1]+pix[+1][0]+pix[0][+1])/4$$

Here, a coordinate [−1][0] represents the coordinate of a left adjacent pixel of a pixel at coordinate [0][0], a coordinate [0][−1] represents the coordinate of a lower adjacent pixel of a pixel at coordinate [0][0], a coordinate [+1][0] represents the coordinate of a right adjacent pixel of a pixel at coordinate [0][0], and a coordinate [0][+1] represents the coordinate of a upper adjacent pixel of a pixel at coordinate [0][0].

In step S215, the mixing ratio calculation unit 114 substitutes the value of the correcting target pixel with the corrected pixel value I.

In step S216, the mixing ratio calculation unit 114 does not perform correction, or only performs a gain adjustment. If the exposure time difference tv_dif is sufficiently small, since there is no need to perform correction, the processing of step S216 is performed. If the moving amount mov of the correcting target region, in other words the blur, is sufficiently small, since there is no need to perform correction, the processing of step S216 is performed.

In the manner mentioned above, the processing in step S205 to step S216 is performed repeatedly on all of the functional pixels.

According to the above operation, when there is no movement in the digital camera 1 or the object, or when there is no difference in the exposure time between the functional pixels and the non-functional pixels, by using the output of the functional pixels itself which has been gain adjusted, degradation in resolution may be prevented. Furthermore, when there is movement in the digital camera 1 or the object, or when there is a difference in the exposure time between the functional pixels and the non-functional pixels, image quality degradation caused by the difference in the blur amount occurring between the functional pixels and the non-functional pixels is corrected. Therefore, according to the digital camera 1 of the present embodiment, image quality degradation caused by exposure times that are different between the functional pixels and the non-functional pixels may be reduced, which realizes correction with high robustness regarding the effect on a picture.

In the above explanations, the case in which two types of different exposure times are used between the functional pixels and the non-functional pixels was given. In the case where more than two types of different exposure times are used for every pixel, the image processing for correcting image degradation according to the present embodiment will be effective.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus which performs image processing on image data obtained by using an imaging element comprising a plurality of pixels which comprise a first pixel being a functional pixel with a focus detection function and a second pixel being a non-functional pixel, which is without the focus detection function and is a pixel other than the functional pixel, wherein two different types of exposure times are applied between the functional pixel and the non-functional pixel, the image processing apparatus comprising:
- a blur amount estimation unit which estimates an image blur amount present in the image data;
- an exposure time difference calculation unit which calculates an exposure time difference, the exposure time difference being a difference between an exposure time of the first pixel and an exposure time of the second pixel included in the image data;
- a mixing ratio calculation unit which, based on the exposure time difference and the image blur amount, determines a first ratio using a light amount detected by the first pixel to be a target and a second ratio using a light amount detected by the second pixel positioned around the first pixel; and
- a correction unit which corrects the image data based on the image blur amount, the exposure time difference, the first ratio, and the second ratio.

2. The image processing apparatus according to claim 1, wherein the mixing ratio calculation unit increases the second ratio as the exposure time difference increases.

3. The image processing apparatus according to claim 2, wherein the mixing ratio calculation unit increases the second ratio as the image blur amount increases.

4. The image processing apparatus according to claim 1, further comprising a correction method determination unit which determines content of the correction based on the image blur amount calculated by the blur amount estimation unit, and the exposure time of the first pixel and the exposure time of the second pixel, wherein
the correction unit corrects the image data based on the content of the correction.

5. The image processing apparatus according to claim 4, wherein
the correction method determination unit decides to perform correction when determining that the exposure time difference and the image blur amount are present, and
the correction unit corrects the light amount detected by the first pixel to be a target by using the light amount detected by the first pixel to be the target, and the light amount detected by the second pixel positioned around the first pixel to be the target when the correction method determination unit decides to perform the correction.

6. The image processing apparatus according to claim 1, wherein the blur amount estimation unit estimates the image blur amount based on an image blur occurring evenly on the entire image data and an image blur occurring locally on a part of the image data.

7. An imaging apparatus comprising:
the image processing apparatus of claim 1; and
the imaging element.

8. The imaging apparatus according to claim 7, further comprising an exposure controller which performs exposure control at exposure times different between the functional pixel and the non-functional pixel.

9. The imaging apparatus according to claim 8, wherein the exposure controller makes the exposure time of the functional pixel and the exposure time of the non-functional pixel different in accordance with a luminance of an object.

10. The imaging apparatus according to claim 9, wherein the exposure controller makes the exposure time of the functional pixel longer than the exposure time of the non-functional pixel when the object is of low luminance, and makes the exposure time of the functional pixel shorter than the exposure time of the non-functional pixel when the object is of high luminance.

11. An image processing method for image data obtained by using an imaging element comprising a plurality of pixels which comprise a first pixel being a functional pixel with a focus detection function and a second pixel being a non-functional pixel, which is without the focus detection function and is a pixel other than the functional pixel, wherein different exposure times are applied between the functional pixel and the non-functional pixel, the image processing method comprising:
- estimating an image blur amount present in the image data;
- calculating an exposure time difference which is a difference between an exposure time of the first pixel and an exposure time of the second pixel included in the image data;
- determining a first ratio using a light amount detected by the first pixel to be a target and a second ratio using a light amount detected by the second pixel positioned around the first pixel to be the target based on the exposure time difference and the image blur amount; and
- correcting the image data based on the image blur amount, the exposure time difference, the first ratio, and the second ratio.

* * * * *